Patented Nov. 19, 1935

2,021,539

UNITED STATES PATENT OFFICE 2,021,539

ETHEREAL SULPHUR-CONTAINING COMPOUNDS AND PROCESS OF PRODUCING SAME

Friedrich Boedecker, Dahlem, near Berlin, Germany

No Drawing. Application September 30, 1933, Serial No. 691,736. In Germany July 4, 1932

20 Claims. (Cl. 260—17)

The present invention relates to a process of producing novel derivatives of ethereal sulphur-containing oils.

It is well known, that ethereal sulphur-containing oils, such as for instance mustard-seed oil, asant oil and garlic oil have a very repugnant smell. I have now found, that said oils together with desoxycholic acid (dihydroxycholanic acid) or apocholic (dihydroxycholenic acid) acid—the two derivatives of the cholic acid, which can form choleinic acids—will form nicely crystallized odorless addition compounds and that the same result will be obtained when instead of the oils the fractions of same are used, which according to Semmler consists of disulphides (Archiv der Pharmazie, 1892, pages 230, 434).

The producing of said compounds may be performed in usual manner, preferably by allowing the components or constituents to act upon each other in an alcoholic solution. Instead of the oils also extracts containing such oils may be used. If oils are used which consist of a plurality of different components also the individual fractions may be subjected to the same treatment or the end product may be decomposed into the different fractions by crystallization. Finally, the addition compounds produced by means of the novel treatment may also be decomposed in such a manner (see German Patent No. 394,796) that the said oils may be obtained in pure state. The novel addition compounds are intended for therapeutic purposes.

Example 1

10 g. of desoxycholic acid are dissolved in 30 ccm. of hot alcohol and to this solution 2 g. of asant oil is added which has been produced from asafœtida by steam distillation. When the product is allowed to cool a crystalline matter will separate out, and this matter is filtered and subsequently washed with alcohol which is cooled with ice. After drying an odorless end product is obtained, which has a melting point of about 167–168° C.

Example 2

0.5 g. of a fraction of oleum asafœtida which distils over in a vacuum of 11 mm. mercury at 104–138° C. are introduced into a hot solution of 3 g. of desoxycholic acid in 9 ccm. of alcohol under stirring. When the product is allowed to cool a compound will crystallize out which has a melting point of 168–170° C. and which does not alter its melting point after recrystallization from alcohol. The product consists of column-like crystals of perfect shape and is totally odorless. The intense smell of the ethereal oil will appear again when the compound is heated in a diluted soda solution.

Example 3

5 g. of apocholic acid are dissolved at raised temperature in 15 ccm. of alcohol. After addition of 1 g. of mustard-seed oil and cooling a compound will crystallize out which has a melting point of 166–169° C. This product which also is fully odorless, may again be decomposed into its constituents by heating it in a diluted soda solution.

Various modifications of the invention may be resorted to without departing from the spirit of the invention the scope of which is set forth in the annexed claims:

I claim:

1. A process of producing novel derivatives of ethereal sulphur-containing oils, comprising causing a reaction between such oils and such derivatives of cholic acid which can form choleinic acids.

2. A process of producing novel derivatives of ethereal sulphur-containing oils, comprising causing ethereal sulphur-containing oils and such derivatives of cholic acid which can form choleinic acids to act upon each other in a solution.

3. A process of producing novel derivatives of ethereal sulphur-containing oils, comprising melting together ethereal sulphur-containing oils and such derivatives of cholic acid which can form choleinic acids.

4. A process of producing novel derivatives of ethereal sulphur-containing oils, comprising combining such oils with desoxycholic acid in a solution.

5. A process of producing novel derivatives of ethereal sulphur-containing oils, comprising combining such oils with apocholic acid in a solution.

6. A process of producing novel derivatives of ethereal sulphur-containing oils, comprising combining extracts containing such oils with desoxycholic acid in a solution.

7. A process of producing novel derivatives of ethereal sulphur-containing oils, comprising combining extracts containing such oils with apocholic acid in a solution.

8. A process of producing novel derivatives of ethereal sulphur-containing oils, comprising combining a fraction of an ethereal sulphur-containing oil with desoxycholic acid in a solution.

9. A process of producing novel derivatives of ethereal sulphur-containing oils, comprising combining a fraction of an ethereal sulphur-containing oil with apocholic acid in a solution.

10. A process of producing novel derivatives of ethereal sulphur-containing oils, comprising dissolving desoxycholic acid in hot alcohol, adding an ethereal sulphur-containing oil, allowing the solution to cool, separating by filtration the crystalline precipitate formed and washing the filtrate with alcohol.

11. A process of producing novel derivatives of ethereal sulphur-containing oils, comprising dissolving apocholic acid in hot alcohol, adding an ethereal sulphur-containing oil, allowing the solution to cool, separating by filtration the crystalline precipitate formed and washing the filtrate with alcohol.

12. As a commercial product, a compound of ethereal sulphur-containing oils and such derivatives of cholic acid which can form choleinic acids.

13. As a commercial product, a compound of ethereal sulphur-containing oils and desoxycholic acid.

14. As a commercial product, a compound of ethereal sulphur-containing oils and apocholic acid.

15. As a commercial product, a compound of extracts containing ethereal sulphur-containing oils and desoxycholic acid.

16. As a commercial product, a compound of extracts containing ethereal sulphur-containing oils and apocholic acid.

17. As a commercial product, a compound of a fraction of an ethereal sulphur-containing oil and desoxycholic acid.

18. As a commercial product, a compound of a fraction of an ethereal sulphur-containing oil and apocholic acid.

19. As a commercial product, a compound of an ethereal sulphur-containing oil and desoxycholic acid in the form of odorless crystals having a melting point substantially within the temperature range of 167–170° C.

20. As a commercial product, a compound of an ethereal sulphur-containing oil and apocholic acid in the form of odorless crystals having a melting point substantially within the temperature range of 166–169° C.

FRIEDRICH BOEDECKER.